(12) United States Patent
Kwon et al.

(10) Patent No.: US 11,117,349 B2
(45) Date of Patent: Sep. 14, 2021

(54) CONDUCTIVE FILM, AND METHOD FOR PREPARING THE SAME

(71) Applicant: LG CHEM, LTD., Seoul (KR)

(72) Inventors: Tae Gyun Kwon, Daejeon (KR);
Young Sik Yoon, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 69 days.

(21) Appl. No.: 16/339,671

(22) PCT Filed: Oct. 30, 2017

(86) PCT No.: PCT/KR2017/012054
§ 371 (c)(1),
(2) Date: Apr. 4, 2019

(87) PCT Pub. No.: WO2018/088738
PCT Pub. Date: May 17, 2018

(65) Prior Publication Data
US 2019/0291385 A1    Sep. 26, 2019

(30) Foreign Application Priority Data
Nov. 10, 2016    (KR) .......................... 10-2016-0149211

(51) Int. Cl.
*B32B 15/02*    (2006.01)
*B32B 5/16*    (2006.01)
(Continued)

(52) U.S. Cl.
CPC ............... *B32B 15/02* (2013.01); *B32B 5/14* (2013.01); *B32B 5/16* (2013.01); *B32B 15/08* (2013.01);
(Continued)

(58) Field of Classification Search
CPC .. B32B 15/02; B32B 5/14; B32B 5/16; B32B 15/08; B32B 15/16; B32B 15/20; B32B 27/308; B32B 27/38; H01B 1/02
See application file for complete search history.

(56) References Cited

U.S. PATENT DOCUMENTS

| 5,930,026 A | 7/1999 | Jacobson et al. |
| 2002/0075556 A1 | 6/2002 | Liang et al. |

(Continued)

FOREIGN PATENT DOCUMENTS

| CN | 1519635 A | 8/2004 |
| CN | 101065323 A | 10/2007 |

(Continued)

OTHER PUBLICATIONS

KR-20150098179-A Translation (Year: 2015).*
(Continued)

*Primary Examiner* — Travis M Figg
(74) *Attorney, Agent, or Firm* — Dentons US LLP

(57) ABSTRACT

The present application relates to a conductive film and a method for preparing the same. The conductive film comprises a continuous phase; and a plurality of separate phases formed in the continuous phase. The continuous phase comprises a polymer, and the separate phase comprises conductive particles. The separate phase is distinguished from the continuous phase by an amphipathic compound. The present application can simplify the production process and reduce the production cost because drivable particles can be trapped without being subjected to a separate barrier forming process.

12 Claims, 1 Drawing Sheet

(51) Int. Cl.
- *B32B 15/08* (2006.01)
- *B32B 15/16* (2006.01)
- *B32B 15/20* (2006.01)
- *H01B 1/02* (2006.01)
- *B32B 5/14* (2006.01)
- *B32B 27/30* (2006.01)
- *B32B 27/38* (2006.01)

(52) U.S. Cl.
CPC .............. *B32B 15/16* (2013.01); *B32B 15/20* (2013.01); *B32B 27/308* (2013.01); *B32B 27/38* (2013.01); *H01B 1/02* (2013.01)

(56) References Cited

U.S. PATENT DOCUMENTS

| | | | |
|---|---|---|---|
| 2003/0137717 A1* | 7/2003 | Albert | G02F 1/167 359/296 |
| 2004/0182711 A1 | 9/2004 | Liang et al. | |
| 2006/0256423 A1* | 11/2006 | Yamamoto | G02F 1/16757 359/296 |
| 2007/0071684 A1 | 3/2007 | Crutchley et al. | |

FOREIGN PATENT DOCUMENTS

| | | |
|---|---|---|
| CN | 103680766 A | 3/2014 |
| JP | 2002-526812 A | 8/2002 |
| JP | 2003-140202 A | 5/2003 |
| JP | 2004-004770 A | 1/2004 |
| JP | 2006-516765 A | 7/2006 |
| JP | 2006-320891 A | 11/2006 |
| JP | 2007-506543 A | 3/2007 |
| JP | 2008-41576 A | 2/2008 |
| KR | 1020080100991 A | 11/2008 |
| KR | 1020110085299 A | 7/2011 |
| KR | 101300442 B | 8/2013 |
| KR | 1020140007359 A | 1/2014 |
| KR | 10-2015-0078169 A | 7/2015 |
| KR | 20150098179 A * | 8/2015 |
| KR | 1020150098179 A | 8/2015 |
| KR | 1020160003680 A | 1/2016 |
| KR | 1020160037272 A | 4/2016 |
| WO | 02/01281 A2 | 1/2002 |
| WO | WO-0201281 A2 * | 1/2002 ........... G02F 1/1679 |
| WO | 2004/068234 A1 | 8/2004 |
| WO | 2005/030883 A1 | 4/2005 |
| WO | WO-2005062679 A1 * | 7/2005 ............ H05B 33/28 |
| WO | 2012/136781 A1 | 10/2012 |

OTHER PUBLICATIONS

Kim et al. ("Room temperature flexible and transparent ITO/Ag/ITO electrode grown on flexible PES substrate by continuous roll-to-roll sputtering for flexible organic photovoltaics" J. Phys. D: Appl. Phys. 42, 2009, p. 235109) (Year: 2009).*

* cited by examiner

[Figure 1]
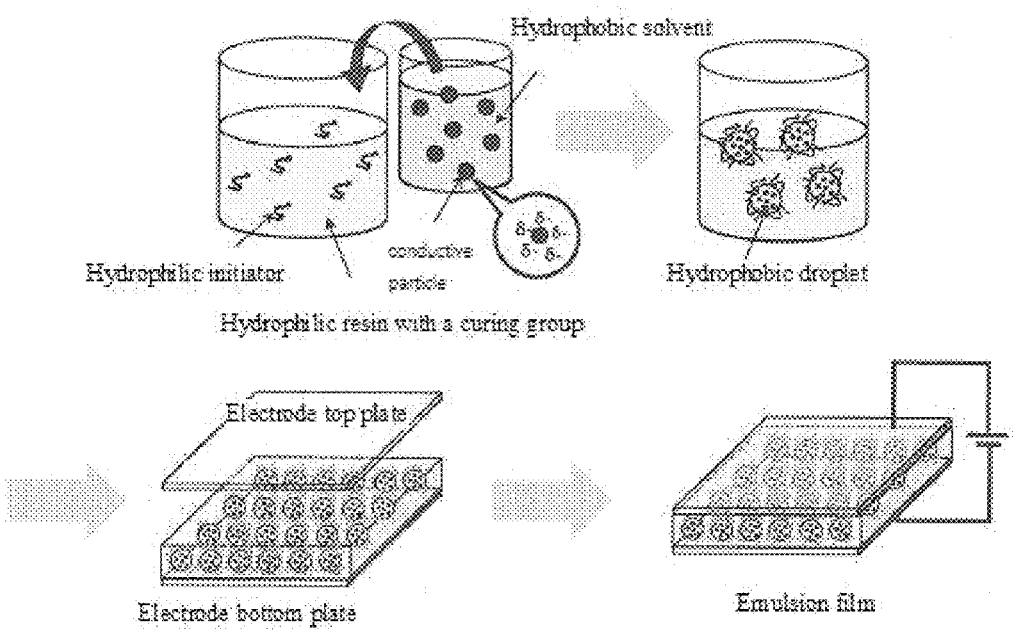
[Figure 2A]   [Figure 2B]
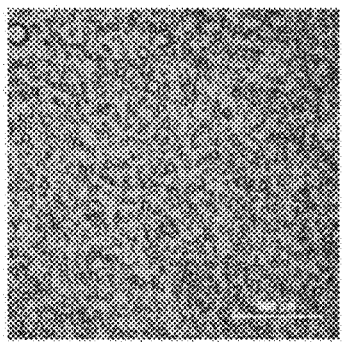 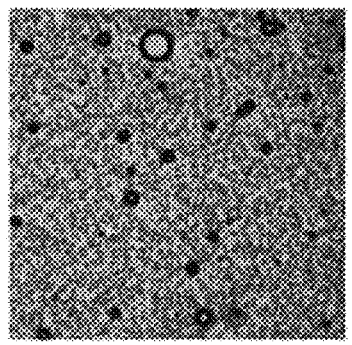

CONDUCTIVE FILM, AND METHOD FOR PREPARING THE SAME

CROSS-REFERENCE TO RELATED APPLICATIONS

This application is a National Stage Application of International Application No. PCT/KR2017/012054, filed on Oct. 30, 2017, which claims priority to and the benefits of Korean Patent Application No. 10-2016-0149211, filed with the Korean Intellectual Property Office on Nov. 10, 2016, the entire contents of which are incorporated herein by reference.

TECHNICAL FIELD

The present application relates to a conductive film and a method for preparing the same.

BACKGROUND ART

When the electrically driven cell comprises charged particles or liquid crystals, a barrier is used to trap the charged particles or liquid crystals in a certain space inside the cell. Such a barrier is formed by patterning a polymer layer provided on a substrate and for the patterning, photolithography, photoresist or mold printing, and the like is generally used. However, the process for forming the barrier as above has problems of complicating the production process or increasing the production cost, and causing damage to electrodes during the process.

DISCLOSURE

Technical Problem

It is one object of the present application to provide a conductive film comprising liquid crystals or charged particles without forming any barrier.

It is another object of the present application to provide a conductive film in which the production process is simplified and the production cost is reduced.

These and other objects of the present application can be all solved by the present application, which is described in detail below.

Technical Solution

In one example related to the present application, the present application relates to a conductive film. The conductive film may comprise an intermediate layer between conductive substrates provided so as to face each other. The conductive substrate may be an electrode base layer, and the intermediate layer may comprise a continuous phase and separate phases.

In one example, the conductive substrate may be an electrode comprising a transparent conductive metal oxide. As the transparent conductive metal oxide, for example, ITO (indium tin oxide), $In_2O_3$ (indium oxide), IGO (indium galium oxide), FTO (fluor doped tin oxide), AZO (aluminium doped zinc oxide), GZO (galium doped zinc oxide), ATO (antimony doped tin oxide), IZO (indium doped zinc oxide), NTO (niobium doped titanium oxide), ZnO (zinc oxide), or CTO (cesium tungsten oxide) may be used.

In another example, the conductive substrate may be a metal mesh electrode. As the metal material for forming the metal mesh, for example, silver (Ag), copper (Cu), aluminum (Al), magnesium (Mg), gold (Au), platinum (Pt), tungsten (W), molybdenum (Mo), titanium (Ti), nickel (Ni) or an alloy thereof may be used.

In another example, the conductive substrate may be an OMO (oxide/metal/oxide) electrode. The OMO (oxide/metal/oxide) electrode may have a form that a metal layer is interposed between two metal oxide layers. For the metal oxide layer included in the OMO (oxide/metal/oxide) electrode, for example, one or more metal oxides selected from the group consisting of Sb, Ba, Ga, Ge, Hf, In, La, Ma, Se, Si, Ta, Se, Ti, V, Y, Zn and Zr may be used. In addition, as a forming component of the metal layer interposed between the metal oxide layers, silver (Ag), copper (Cu), aluminum (Al), magnesium (Mg), gold (Au), platinum (Pt), tungsten (W), molybdenum (Mo), titanium (Ti) or nickel (Ni) may be used, without being particularly limited.

In one example, the conductive film may comprise a plurality of conductive substrates. In this case, the intermediate layer may be provided between any two conductive substrates of the plurality of conductive substrates, and the conductive substrate may be referred to as an upper conductive substrate or a lower conductive substrate depending on positional relations with the intermediate layer.

In one example, the conductive substrate may be a laminate of an electrode base layer comprising any one of the above-mentioned electrode materials and a light-transmissive base layer having a transmittance of about 50% to 90% with respect to visible light. At this time, the light-transmissive base layer may be laminated on one side of the light-transmissive base layer so as to be located on an outer side of the conductive film. In the present application, the visible light may mean light in a wavelength range of, for example, 380 nm to 780 nm.

The kind of the usable light-transmissive base layer is not particularly limited, and for example, transparent glass or polymer resins can be used. More specifically, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene), and the like can be used, without being limited thereto.

The intermediate layer may comprise a continuous phase comprising a polymer and a plurality of separate phases formed in the continuous phase.

The continuous phase may be a polymer matrix in which a plurality of separate phases may be dispersed and present. In one example, the polymer may be a cured product of a compound having a curable functional group. The kind of the compound having the curable functional group is not particularly limited, and for example, a compound having an acrylate group or an epoxy group can be used for forming a polymer. The curing method for forming the continuous phase is not particularly limited.

The separate phase may be defined by an amphipathic compound. More specifically, as described below, the intermediate layer of the present application can be provided through curing of an emulsified liquid, where before curing of the emulsified liquid, an amphipathic compound is present at the interface of droplets dispersed in the continuous phase, and thus the separate phase can be distinguished from the continuous phase, and after curing of the continuous phase, the separate phase can be defined in the final product in a state surrounded by the amphipathic compound. The kind of the usable amphipathic compound is not particularly limited, and a suitable compound may be used in consideration of the characteristics of the production method of the present application to be mentioned below.

In one example, the separate phase may be spherical or ellipsoidal. More specifically, since the droplet is formed in the emulsified liquid through the method to be mentioned below and then the curing is performed for the emulsified liquid, the separate phase may have a spherical or ellipsoidal shape like the droplet. The size of the separate phase is not particularly limited, but it may be in a range of, for example, 1 μm to 100 μm.

The separate phase may comprise conductive particles having a polarity different from a voltage applied to any one of the conductive substrates therein. More specifically, the conductive particles contained in the separate phase may be charged particles having a (−) or (+) electric charge. The kind of the specific conductive particles is not particularly limited, but for example, carbon black, ferric oxides, chromium copper (CrCu) or aniline black, and the like may be used as the conductive particles.

In one example, the separate phase may further comprise a driving solvent. The driving solvent allows the conductive particles to have mobility in the separate phase. Specifically, the driving solvent is a solvent having no curing group, which can ensure the mobility of the conductive particles even after curing of the emulsified liquid. The kind of the drivable solvent is not particularly limited, which may be suitably selected in consideration of the production method of the present application to be mentioned below.

In one example, the conductive film may further comprise a power source. The power source may be configured to apply an appropriate level of voltage to the conductive film. The size of the voltage applied by the power source, or the electrical connection manner between the conductive film and the power source can be appropriately selected and applied by those having ordinary knowledge in the art.

In another example related to the present application, the present application relates to a method for preparing a conductive film. The method for preparing a conductive film may be comprised of mixing a first composition (A) forming a continuous phase with a second composition (B) forming a disperse phase or a separate phase to form an emulsified liquid, applying the emulsified liquid on a conductive substrate and then curing it.

The constitution and other features of the conductive substrate are the same as those mentioned above.

In one example, the first composition (A) may comprise a compound (a1) having a curing group. The compound (a1) having the curing group functions as a dispersion medium for droplets formed in the emulsified liquid, as described below, which can form a continuous phase.

In one example, the second composition (B) may comprise a driving solvent (b1) which is immiscible with the compound (a1) contained in the first composition and conductive particles (b2). In the present application, the term [immiscible] can be used as the same meaning as that used in a conventional emulsification method. For example, when two or more dispersion media or solvents are simply mixed, the mixed materials may be said to be immiscible with each other, if phase separation occurs without mixing with each other. Although it is not particularly limited, for example, when the compound (a1) has a property of being mixed with a hydrophilic solvent such as water or ethyl acetate without any phase separation, the driving solvent (b2) may be selected from hydrophobic solvents such as methylene chloride (MC), normal hexane (n-hexane), isoparaffin or toluene. Conversely, when the compound (a1) has a property of being mixed with the hydrophobic solvent without any phase separation, a solvent having hydrophilicity may be selected as the driving solvent (b2).

In one example, the emulsified liquid may be provided such that the compound (a1) having the curing group forms a continuous phase and the second composition (B) forms a disperse phase, that is, a plurality of separate phases. To this end, a relatively large amount of the first composition (A) and a relatively small amount of the second composition (B) may be mixed. In one example, the emulsified liquid may comprise 10 to 60 parts by weight of the second composition (B) relative to 100 parts by weight of the first composition (A). When the first and second compositions are mixed by the above contents and compositions, droplets in a disperse phase formed of the second composition (B) may be formed in the first composition (A) as a continuous phase. The formed droplets may be spherical or ellipsoidal.

In one example, the emulsified liquid may further comprise an amphipathic compound (C), that is, a surfactant to ensure dispersion stability of the droplets. More specifically, the emulsified liquid may comprise 0.05 to 10 parts by weight of the amphipathic compound, relative to 100 parts by weight of the first composition (A).

The time when the amphipathic compound is added is not particularly limited. For example, the amphipathic compound may be contained in advance in each composition before formation of the emulsified liquid, and the amphipathic compound may be added at the time of mixing the first and second compositions, or the amphipathic compound may be further added the emulsified liquid at an appropriate time after mixing the first and second compositions.

The kind of the surfactant usable as the amphipathic compound is not particularly limited. For example, a cationic surfactant, an anionic surfactant, a zwitterionic surfactant, or a nonionic surfactant may be used. More specifically, a cationic surfactant such as a quaternary ammonium compound, a sulfonium compound, an amine salt or an imidazolinium salt; an anionic surfactant such as ammonium lauryl sulfate, sodium 1-heptanesulfonate, sodium hexanesulfonate or sodium dodecylsulfate; a zwitterionic surfactant such as N-dodecyl-N,N-dimethyl-3-ammonio-1-propane sulfonate, betaine or alkyl betaine; and a nonionic surfactant such as SPAN 60, polypropylene glycol or polyvinylpyrrolidone can be used without limitation.

In the first composition (A), the droplets formed by the second composition (B) can ensure the mobility of the conductive particles (b2). Specifically, as described below, the compound (a1) contained in the first composition functions as a kind of binder or matrix for micelles through curing, but since the driving solvent (b1) forming the micelles has no curing group unlike the compound (a1), it is not cured even when curing the emulsified liquid and allows the conductive particles (b2) charged depending on the voltage applied to the electrode to move. In one example, considering the mobility and the dispersion stability in the driving solvent of the conductive particles, the second composition (B) may comprise 0.05 to 10 parts by weight of the conductive particles (b2) relative to 100 parts by weight of the driving solvent (b1).

In one example, in order to further ensure the dispersion stability of the emulsified liquid and to form uniform droplets of a fine size, the production method of the present application may further comprise a step of mixing and stirring the emulsified liquid using a homogenizer. The stirring speed or stirring time by the homogenizer is not particularly limited and can be appropriately controlled by those skilled in the art.

In one example, the size of the droplets formed in the emulsified liquid may be 1 μm to 100 μm. If the size of the droplet exceeds 100 μm, it is not preferable since the separate phase is observed.

In one example, the compound (a1) having a curable functional group may comprise an acrylate group or an epoxy group as a curing group. Specifically, the compound (a1) may be a compound containing an acrylate group or an epoxy group, while having hydrophilic or hydrophobic properties. Considering the formation process of the emulsified liquid, the hydrophobic or hydrophilic property imparted to the compound (a1) is not uniformly judged. For example, in addition to the curing group, hydrophobicity or hydrophilicity can be judged in consideration of the polarity of the functional group contained in the compound or the length of the carbon chain in the compound, and the like. In particular, the determination of the hydrophilicity or hydrophobicity of the compound (a1) can be judged from the relative relations with the driving solvent (b1) mixed together at the time of forming the emulsified liquid.

Although it is not particularly limited, when the compound (a1) comprises an acrylate as the curable functional group, trimethylolpropane triacrylate, pentaerythritol triacrylate, pentaerythritol tetraacrylate, dipentaerythritol monohydroxypentaacrylate, dipentaerythritol hexaacrylate, 1,4-butylene glycol diacrylate, 1,6-hexanediol diacrylate or polyethylene glycol diacrylate, and the like can be used as the compound (a1). In this case, as the driving solvent (b1), a solvent which is insoluble or immiscible with the compounds listed above, for example, isoparaffin or the like may be used.

The method of applying the emulsified liquid on the conductive substrate is not particularly limited, and for example, a known method such as bar coating, gravure coating, dipping and spin coating can be used without any limitation. In one example, the emulsified liquid may be injected between two opposing conductive substrates, coated on the conductive substrates, and then cured as follows, or may be applied on one conductive substrate, and then cured as follows.

The curing method for forming the continuous phase is not particularly limited. For example, the curing can be performed by any one of stirring, heat irradiation or light irradiation.

The curing method by stirring is not particularly limited, but it can be performed, for example, through stirring at a temperature of 80° C. or less for 1 hour to 6 hours. The (partial) curing by stirring can be performed through hydrogen bonding with respect to the curing group-containing compound. In this case, the first composition (A) may further comprise water or DMSO (dimethyl sulfoxide), and the like.

The curing method by heat irradiation is not particularly limited, but it can be performed, for example, at a temperature in a range of 80° C. to 160° C. The thermal curing can be applied when the curing group-containing compound has an epoxy group.

The curing method by light irradiation is not particularly limited, but it can be performed, for example, by being irradiated with UV light in a range of 500 mJ/m$^2$ to 2,500 mJ/m$^2$. The photo curing can be applied when the curing group-containing compound has an acrylate group.

In one example, when the thermal curing or photo curing is performed on the compound (a1), the first composition (A) may further comprise a radical initiator or a photoinitiator. The kind or content of the specific initiator is not particularly limited, and a known initiator can be appropriately selected and used.

Through the curing, an intermediate layer comprising a continuous phase and separate phases can be provided. Specifically, since the cured compound (a1) functions as a binder or matrix for the separate phases which are defined by the amphipathic compound and comprise the driving solvent (b1) and the conductive particles (b2), the conductive particles cannot be adsorbed on the electrode even when they move according to the voltage polarity. Therefore, the present application can prevent the durability of the product from deteriorating due to the electrode adsorption of the conductive particles.

In one example, the production method of the present application may further comprise a step of providing another conductive substrate on the intermediate layer such that the intermediate layer is provided between two conductive substrates after curing of the continuous phase. The conductive substrates facing each other may have the same or different electrode materials among the above-mentioned materials.

Such a conductive film may be used for a transmittance-variable element or an electronic paper, and the like. For example, since the conductive film comprises conductive particles movable according to polarity of a voltage to be applied, the conductive film may have a predetermined transmittance change, or may realize a predetermined shape by movement of the conductive particles.

Advantageous Effects

The present application has effects of invention of simplifying the production process and reducing the production cost since the drivable solution comprising conductive particles or liquid crystals can be trapped in the cell by only a simple process of mixing between solvents without barrier formation. In addition, since the cured compound functions as a predetermined matrix, the present application can solve the problem of durability deterioration caused by adsorption of the conductive particles on the electrode.

BRIEF DESCRIPTION OF DRAWINGS

FIG. 1 schematically shows a production method of the present application.

FIG. 2A is an image of a conductive film that does not include any conductive particles.

FIG. 2B is an image of a matrix formed by curing a compound which has formed a continuous phase in an emulsified liquid, and micelles dispersed therein, in a conductive film produced according to the production method of the present application.

Best Mode

Hereinafter, the present application will be described in detail through examples. However, the scope of protection of the present application is not limited by the examples described below.

Example

A first composition was provided using hydrophilic poly (ethylene glycol) diacrylate (Sigma-Aldrich) comprising an initiator (igacure 2959) in a content of 0.1 wt %. Thereafter, a solution (Nanobrick) comprising carbon black charged with (−) electric charge and Isoparaffin G, that is, a second composition, was mixed with a surfactant (polyvinylpyrrolidone, Sigma-Aldrich) and the first composition. At this time, the content ratio of the first composition, the second composition and the surfactant was adjusted to a ratio of 2:1:0.1. While stirring the mixture, it was confirmed that an emulsified liquid comprising uniform and stable droplets was formed.

Thereafter, the emulsified liquid was applied between two substrates (PET substrate on which ITO was deposited) through a bar coating method and irradiated with UV of about 1,000 mJ/m$^2$ to prepare a conductive film comprising an intermediate layer.

FIG. 2B is an image of the conductive film produced using the above example FIG. 2A is an image of a conductive film containing no conductive particle, for comparison with the conductive film produced from the above example.

The invention claimed is:

1. A conductive film comprising a continuous phase; and a plurality of separate phases formed in the continuous phase,
   wherein the continuous phase comprises a polymer,
   wherein each of the plurality of separate phases comprises conductive particles,
   wherein the separate phase is distinguished from the continuous phase by the presence of an amphipathic compound, and
   wherein the amphipathic compound is non-polymerizable.

2. The conductive film according to claim 1, further comprising a lower conductive substrate and an intermediate layer provided on the lower conductive substrate,
   wherein the intermediate layer comprises the continuous phase and the plurality of separate phases.

3. The conductive film according to claim 2, further comprising an upper conductive substrate facing the lower conductive substrate, wherein the intermediate layer is provided between the upper and lower conductive substrates.

4. The conductive film according to claim 1, wherein the polymer is a cured product of a compound having a curable functional group.

5. The conductive film according to claim 4, wherein the curable functional group is an acrylate group or an epoxy group.

6. The conductive film according to claim 3, wherein each of the upper and lower conductive substrates comprises a transparent conductive metal oxide wherein the transparent conductive metal oxide is any one of ITO (indium tin oxide), In$_2$O$_3$ (indium oxide), IGO (indium galium oxide), FTO (fluorine doped tin oxide), AZO (aluminium doped zinc oxide), GZO (galium doped zinc oxide), ATO (antimony doped tin oxide), IZO (indium doped zinc oxide), NTO (niobium doped titanium oxide), ZnO (zinc oxide) or CTO (cesium tungsten oxide).

7. The conductive film according to claim 3, wherein each of the upper and lower conductive substrates is a metal mesh comprising a metal component selected from silver (Ag), copper (Cu), aluminum (Al), magnesium (Mg), gold (Au), platinum (Pt), tungsten (W), molybdenum (Mo), titanium (Ti), nickel (Ni) or an alloy thereof.

8. The conductive film according to claim 3, wherein each of the upper and lower conductive substrates is an OMO (oxide/metal/oxide) electrode in which a metal layer is interposed between two metal oxide layers.

9. The conductive film according to claim 8, wherein the metal oxide layer comprises one or more oxides of a metal selected from the group consisting of Sb, Ba, Ga, Ge, Hf, In, La, Ma, Se, Si, Ta, Se, Ti, V, Y, Zn and Zr.

10. The conductive film according to claim 8, wherein the metal layer comprises silver (Ag), copper (Cu), aluminum (Al), magnesium (Mg), gold (Au), platinum (Pt), tungsten (W), molybdenum (Mo), titanium (Ti) or nickel (Ni).

11. The conductive film according to claim 1, wherein the conductive particle is a charged particle having a (−) or (+) charge, and the charged particle is selected from carbon black, ferric oxides, chromium copper (CrCu) or aniline black.

12. The conductive film according to claim 1, wherein each of the plurality of separate phases further comprises a driving solvent and the conductive particle is mobile in the driving solvent of the separate phase.

* * * * *